June 6, 1972  R. A. PARR  3,667,862
BLADE INSPECTION SYSTEM AND METHOD
Filed Dec. 9, 1970  2 Sheets-Sheet 2

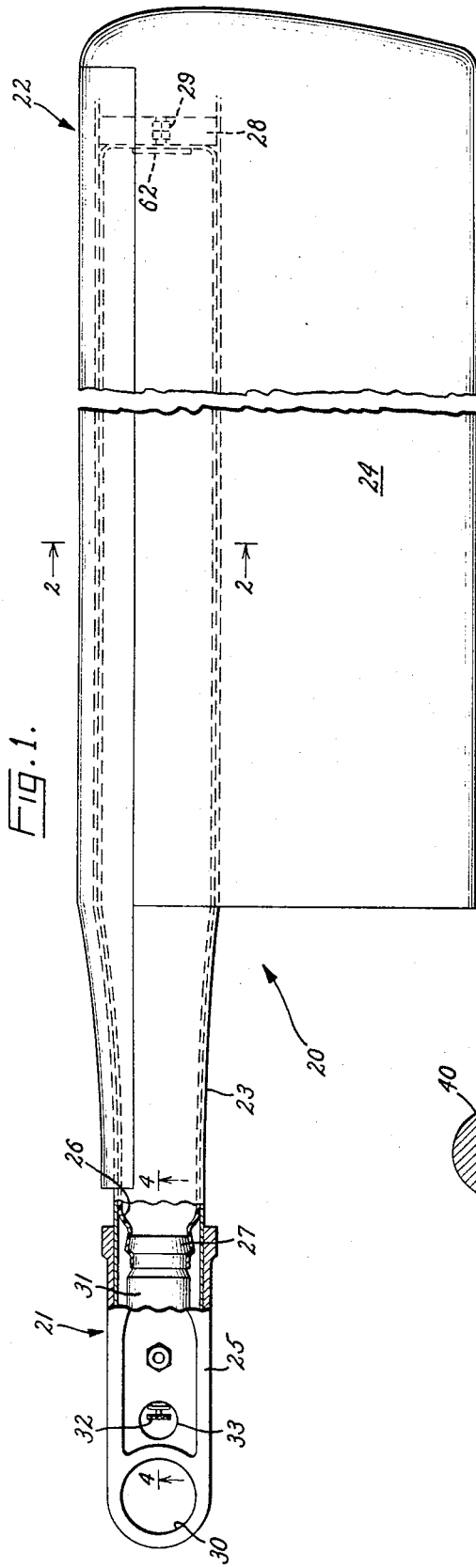
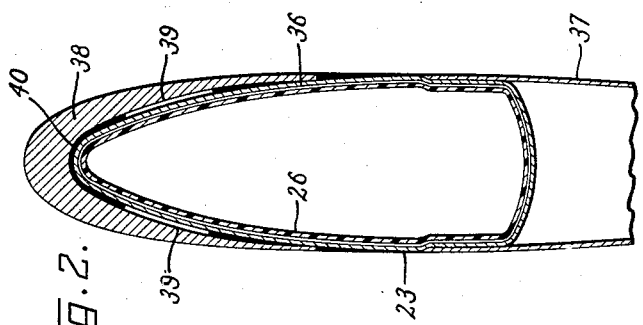

INVENTOR:
ROBERT A. PARR,
BY Joseph M. Corr
ATTORNEY

# United States Patent Office 3,667,862
Patented June 6, 1972

3,667,862
BLADE INSPECTION SYSTEM AND METHOD
Robert A. Parr, Linwood, Pa., assignor to The Boeing Company, Seattle, Wash.
Filed Dec. 9, 1970, Ser. No. 96,419
Int. Cl. B64c 27/46
U.S. Cl. 416—61
11 Claims

ABSTRACT OF THE DISCLOSURE

There is disclosed a method and system for inspecting a rotor blade to detect the presence of a crack in the blade spar. A liner, preferably made of a material of low permeability and in the shape of a sleeve or bag is placed inside the spar. The sleeve is spaced from the spar along its entire length by means of a bleeder cloth and means are provided for evacuating the area occupied by the bleeder. A pressure sensitive device is hermetically coupled to the evacuated area for testing and monitoring the pressure within that area. If a crack develops in the spar, air will enter the evacuated area resulting in a loss of vacuum which will be detected by the pressure sensitive device.

BACKGROUND OF THE INVENTION

This invention relates to a method and system for detecting cracks or leaks in a surface or wall. In particular the invention relates to a system and method of detecting a crack in a wall of a hollow object. More particularly, it relates to a method and apparatus for detecting a crack in the spar of a helicopter rotor blade.

The basic construction of a conventional rotor blade comprises a spar attached to which are boxlike sections forming the blade trailing edge. The spar is hollow and generally has a rounded D shape. Normally, the spar is made of steel or similar material and the boxlike members are of aluminum honeycomb. A de-ice blanket oftentimes referred to as a nose cap, covers the leading edge of the spar and with the trailing edge boxlike members, provides the airfoil contour.

In the helicopter industry, it has been normal practice after a certain period of usage to test the rotor blades and, in particular, the spars, for cracks or other defects. It is important to locate such cracks since they are indicative of a deterioration in the spar structure and, if allowed to spread, will cause the spar to break with consequent loss of the rotor blade. Therefore, to avoid catastrophic accidents, the rotor blades require periodic inspections. Present blade testing techniques include the conventional eddy current and magnetic leakage flux methods. The blades are either inspected while on the aircraft or at a depot. These techniques, however, involve considerable man hours to perform and do not provide a continuous inspection process.

SUMMARY OF THE INVENTION

It is an object of the invention to provide a method and apparatus for detecting a crack in a surface or wall by sensing the loss of vacuum in an area adjacent to the wall. In particular, it is an object of the invention to provide a method and a system for detecting cracks in hollow objects such as rotor blade spars. The area immediately within and adjacent to the spar is evacuated so that loss of vacuum indicates the presence of a crack.

It is a further object of the invention to provide a means for detecting cracks in rotor blade spars while the rotor blades are in place on the aircraft. This object is achieved by means of providing a pressure indicating device in each blade which is capable of testing for a loss of vacuum within the spar.

It is a further object of the invention to provide a sleevelike member which fits within the spar to provide a narrow area which can be evacuated. Preferably, the sleevelike member comprises a three tiered lamination of plastic-metal-plastic.

Another object of the invention is to provide a highly permeable bleeder between the sleeve and the rotor blade spar. The bleeder prevents the sleeve from contacting the spar and provides a space to be evacuated. The bleeder also serves as an air path from a crack in the spar to a pressure detecting means.

An overall object of the invention, therefore, is to provide a method and system for inspecting rotor blades in place on the helicopter which significantly reduces the cost of blade inspection and thereby reduces the maintenance costs for helicopters. An additional object is to insure the safe operation of the helicopter by having an accurate and easily accessible detection system for locating a crack or similar structural deterioration in a blade spar.

Other objects and advantages of the invention will be apparent from the detailed discussion which follows and which describes the method and apparatus of this invention. In summary, the inspection system comprises a sleevelike member of low permeable material which fits inside a blade spar and lines the spar from the tip end bulkhead to the root end. A bleeder made of a highly permeable material is interposed between the spar and sleeve in order to provide a space to be evacuated. The bleeder acts as an air path for air entering the evacuated area through a crack in the spar. A pressure indicator is in communication with the evacuated area for sensing a loss of vacuum therein and thereby indicating the presence of a crack. Additional details of the invention will be illustrated in the following discussion and the accompanying drawings. The broad applicability of the invention as a leak detection device will be apparent from the discussion.

BRIEF DESCRIPTION OF THE DRAWINGS

FIG. 1 shows a helicopter rotor blade with portions cut out to illustrate the crack detection system of the invention.

FIG. 2 is a cross-sectional view of a rotor blade illustrating the position of the vacuum liner.

FIG. 3 illustrates layers of material which are assembled to form the vacuum liner and bleeder.

DESCRIPTION OF THE PREFERRED EMBODIMENTS

Figure 4:
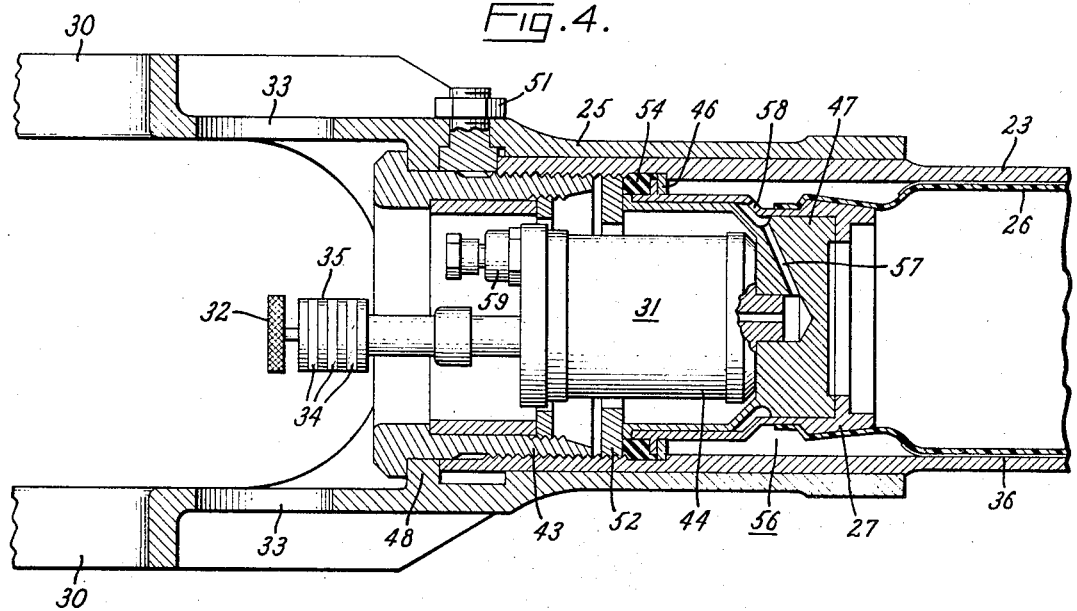
FIG. 4 is a detailed drawing in section of the root end of the rotor blade showing the pressure indicator and the position of the liner.

The following discussion together with the drawings relates to a preferred form of the invention and to a specific application thereof, i.e., to helicopter rotor blades. This is not to be taken as limitative of the scope of the invention since various modifications, uses and applications of the invention are readily apparent to those skilled in the art.

FIG. 1 shows a helicopter rotor blade 20 with selected portions removed to expose the basic features of the inspection system. Details of the invention are left to subsequent figures. The opposite ends of the blade are referred to as the root 21 and the tip 22, respectively. The blade spar 23 is a hollow, tubular shaped member, normally made of steel, and is the main structure of the blade. Box-like members are attached to the spar along its length to form the blade trailing edge. This portion of the blade is shown in plan form at 24.

Lining the interior of the spar 23 for substantially its entire length is a liner 26 which defines a wall for a vacuum area immediately adjacent the spar. The liner is spaced from the spar by a bleeder which is not shown in FIG. 1 but appears in the subsequent figures. Except in FIG. 3, the liner 26 will be shown as a material of single thickness although it is to be understood that the liner preferably is made of layers of different materials. The liner is secured at the blade root to a metal ring 27 and at the tip end to the bulkhead assembly 28.

A vent 29 is shown passing through bulkhead 28 and communicating with the liner interior. The vent 29 is part of the outboard liner fitting 62 which holds the liner in place. The vent admits air under atmospheric pressure to the interior of the liner. Therefore, the liner can be viewed as a bag filled with air and fitting snugly inside the hollow spar.

A pressure sensitive device 31 is housed within the spar at the root end 21 and has a test button 32 in the form of a plunger. The button 32 can be viewed through a hole 33 normally provided in the root socket 25 which permits easy access to the test button. The socket is bifurcated and has a hole 30 in each finger for a pin to pass through and connect the blade to the hub.

The system of this invention can be generally described at this point. The small area occupied by the bleeder between the liner and the spar is evacuated via an evacuation valve which can be seen in FIG. 4. The pressure device 31 is in communication with the evacuated area and indicates any loss of vacuum. Test button 32 permits periodic testing of the presence of a vacuum without disturbing the system. If a crack develops in spar 23, air will enter the vacuum area and will be sensed by the pressure device 31. Therefore, the invention permits testing the blade for cracks in the spar while the blade remains on the helicopter. This has the beneficial consequences of reducing maintenance time and expenses as well as assuring operational safety by providing an accurate test for structural deterioration of the spar.

FIG. 2 is a cross-sectional view of the rotor blade taken along lines 2—2 of FIG. 1. The spar is again shown as 23 having a generally rounded D shape. The vacuum liner appears at 26. Interposed between the liner and the spar is a bleeder 36 which is a highly permeable material preferably in the form of a woven cloth such as Dacron. The liner is shown in exaggerated scale since in practice it is substantially thinner than the bleeder and as shown in FIG. 3 preferably is a lamination of three layers of material. The purpose of the bleeder is to maintain the evacuation area between the liner and the spar.

If the bleeder were not provided, it is easily recognized that with atmospheric pressure inside the liner, evacuation of the area between the spar and liner would cause the liner to be drawn against the spar and effectively be sealed thereto. The bleeder therefore prevents the liner from contacting the spar and establishes the evacuation area. What is actually evacuated is the area of the pores of the highly permeable bleeder. Also, the bleeder serves as an air path for air entering through a crack in the spar to reach the pressure responsive device at the root end.

A portion of one of the box shaped sections which form the trailing edge of the blade appears at 37. A de-ice blanket, or nose cap 38 is bonded to the front end of the spar by an adhesive 40 and aids in protecting the spar as well as contributing to the smooth airfoil shape. Shown cut out in the adhesive layer 40 are air leak paths 39.

In the operation of this system, it is desirable that a crack in the spar be detected before it has grown to an appreciable size. As stated previously, the crack is detected by means of air entering the crack and being sensed by the sensitive device 31. Without the air leak paths it is obvious from viewing the figure that a crack which develops under the de-ice blanket would have to spread a relatively long distance before it came into contact with air. The air leak paths are provided so that no matter where a crack develops, and regardless of the direction in which it travels, it will contact a source of air before it has grown to an undesirable size.

FIG. 3 is a drawing in section illustrating the construction of the vacuum liner as it appears in place on the bleeder and spar. As seen in the figure the liner 26 is a sandwich of three layers therein 41 indicates a layer of plastic material which is provided on either side of a layer of metal 42. The layers are bonded together by a suitable adhesive or by other techniques known to the industry. The two plastic film layers preferably are polyester terephthalate. commercially referred to as Mylar, while the metal is an aluminum film or foil. The Mylar is used to render the liner light and flexible as well as to protect the aluminum. The aluminum is of lower permeability and enables the liner to hold a vacuum between itself and the spar 23. The bleeder cloth, preferably made of Dacron is shown as 36 and is interposed between the liner and the spar. The bleeder is bonded by a suitable adhesive to the liner and essentially forms a fourth layer thereof. As mentioned previously this highly permeable bleeder provides the vacuum area and the path for any air which might enter through a crack in the spar. Atmospheric pressure is present in the interior of the liner so that the liner and bleeder uniformly line the spar.

FIG. 4 is a cross-sectional view of the blade root showing in detail the pressure indicator arrangement. The vacuum liner and the spar again appear as 26 and 23 respectively. The bleeder 36 occupies the space between the spar and the liner and as mentioned previously, is adhesively bonded to the liner. The spar is threaded at its end and engages a threaded retaining nut 43. The liner fitting ring 27 is shown locked in place by a split ring 46 and the liner 26 is bonded to the liner fitting by a suitable adhesive. The pressure indicator is shown as 31 and is held in place by a support 47. The detail construction of this indicator is not shown since it can be any conventional indicator suitable for the purpose.

Briefly, the preferred indicator 31 comprises a housing 44, within which is a reference pressure capsule shaped as a bellows. A shaft connects the push button 32 with a sliding member attached to the bellows. The pressure within the bellows capsule is set at a predetermined amount (e.g. 4 p.s.i.) while the remainder of the chamber inside the indicator housing is evacuated. If the button 32 is depressed and released, and if there has been no leak in the vacuum system, the sliding member in the bellows will at first move downward and then be returned to its original position. If a leak has occurred in the system, the increased pressure in the indicator housing will cause the bellows to contract and pull the sliding member downward. Upon this action a suitable indicating means such as colored bands, will indicate that the vacuum has been lost. These colored bands are viewed through windows 34 in housing 35 whereby one color will appear when the system is normal but another color will be viewed when the vacuum has been lost and the sliding member inside the indicator has moved down. As stated previously, this type of indicator is conventional and has been adapted to meet the requirements of the particular application described herein.

The retaining nut engages a shoulder 48 of the blade socket 25 and together with the nut and bolt arrangement 51 locks the spar in place with the socket. As shown in the figure the socket is shaped as a fork wherein it is open along its side and has holes 33 in the top and bottom tynes of the fork. Therefore, the visual indicator 35 can be viewed both from the side as well as through the holes 33, as indicated in FIG. 1.

A retaining ring 52 also threadedly engages the spar to retain the indicator support and liner fitting in place. A suitable sealant is provided at 54 to seal off the area 56. The pressure indicator is in communication with area 56 by means of a channel 57 in the indicator support and a hole 58 provided in the liner fitting. A valve 59 in the pressure indicator is provided for connection to a vacuum source for evacuating the area 56 as well as the entire area between the spar and the vacuum liner down to the tip end of the blade. The presence of this vacuum can be tested merely by depressing the test button. The materials used for the various assembly parts are conventional and obvious to those skilled in the art. As is apparent, the parts are primarily made of metal suitable to withstand the structural and dynamic loads to which the blade is subjected.

Figure 5:
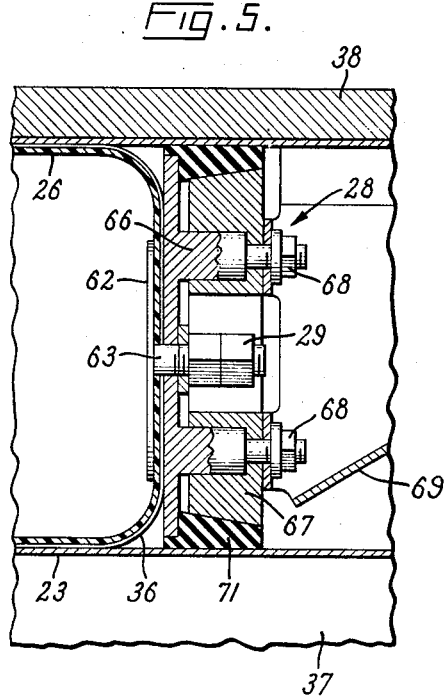
FIG. 5 is a drawing in section of the blade tip showing the sealing bulkhead and the position of the liner.

FIG. 5 is a view in section of the bulkhead 28 provided near the tip end of the blade. Portions of both the de-ice blanket and of one of the box-shaped trailing edge sections are shown at 38 and 37 respectively. The vacuum liner 26 is shown interior and adjacent to the spar 23 and is held in place by an outboard liner fitting 62. The stem 63 of the valve 29 is integral with the outboard liner fitting and passes through a hole in the liner to provide an air inlet to the interior of the liner. Interposed between the liner and the spar is the bleeder 36.

The bulkhead assembly 61 consists of a backing plate 66 with a matching wedge plate 67 locked together by the two bolt and nut arrangements 68. A portion of a gusset extending from the wedge is shown at 69 and in practice is anchored to the spar to provide rigid and accurate location of the bulkhead. A sealing compound 71 is provided in the periphery of the bulkhead for sealing the evacuated area between the spar and the vacuum liner. As discussed previously, air at atmospheric pressure is admitted to the interior of the vacuum liner via valve 29.

In viewing FIGS. 4 and 5 together therefore, it is seen that the entire area between the spar and the vacuum liner is hermetically sealed and can be evacuated via evacuation valve 59 in FIG. 4. The bleeder cloth maintains separation between the vacuum liner and the spar and provides a path for air entering the evacuated area through a crack in the spar to be sensed by the pressure indicator through hole 59 and channel 57.

The thickness of the layers of Mylar and aluminum used in the liner 26 are not critical although they must be thick enough to hold a vacuum. In practice, a liner which has been successfully used has two layers of Mylar, each 0.0005 inch thick with a 0.0005 inch thick layer of aluminum sandwiched between. Also, the thickness of the bleeder is not critical and in practice a Dacron cloth has been successfully used with a thickness of approximately 0.052 inch in thickness.

During the course of this discussion of the invention the term "permeability" was used to describe a necessary characteristic of the various materials. The term is used as a measure of the material's porosity and is a quantitative indication of the amount of gas which can pass through a given area of the material over a prescribed period of time. Therefore, the bleeder is highly permeable and of high porosity since it occupies the evacuated area and serves as an air path from a leak in the spar to the pressure indicator. However, the liner has to be of low permeability, primarily provided by the metal layer, since it serves as one boundary wall of the evacuated area.

As mentioned previously, this invention is not to be considered limited to the specific application described here, i.e., to helicopter rotor blades. Rather, the invention can be used in any instance where a crack or leak in a wall of the container or similar object is to be detected.

Also, the preferred embodiment related to detecting the presence of air or other gas entering the evacuated area causing a loss of vacuum. It should be understood, however, that the invention can be used when it is desired to detect a crack by sensing the presence of any fluid, e.g., a liquid, in the evacuated area. Thus, if an object is submerged in a liquid, such as water, and it is desired to monitor and test the walls of the object for a leak, this invention can be readily adapted for that purpose. Although as described herein the invention is shown with the liner on the interior of the blade spar, it is contemplated that in other applications the liner could be either on the interior or the exterior of the surface which is being tested for cracks. In the helicopter rotor blade application, various problems and considerations dictate placing the liner inside the blade spar as the preferred mode. Modifications to the invention and the many uses and applications thereof are readily apparent to those skilled in the art and are clearly encompassed by the invention defined in the following claims.

What I claim is:

1. A system for detecting a crack in the spar of a helicopter rotor blade comprising in combination an impermeable sleevelike liner lining the interior of said spar for substantially its entire length, a bleeder of highly permeable material positioned between said liner and said spar and maintaining said liner spaced from said spar, means for sealing the area between said linear and said spar and occupied by said bleeder, for retaining a vacuum in said sealed area, pressure sensing means in communication with said sealed area and indicating means associated with said pressure sensing means for indicating a loss of vacuum in said evacuated area.

2. A system of claim 1 including means for connecting said sealed area to a vacuum source for evacuating same.

3. A system of claim 1 wherein said bleeder is a Dacron cloth and said linear comprises three layers of material sandwiched together wherein the first and third layers are a plastic material and the middle layer is a metal.

4. A system of claim 3 wherein said first and third layers are made of polyester terephthalate and said middle layer is aluminum.

5. A system of claim 4 wherein a de-ice blanket is bonded to and covers the leading edge of said spar by means of an adhesive bonding material and wherein air paths are provided in said adhesive bonding material whereby air is capable of reaching a crack formed in said spar beneath said de-ice blanket.

6. A system of claim 5 wherein said air paths comprise channels formed in said adhesive bonding material by the removal of portions of said adhesive material.

7. In combination with a helicopter,
   a rotor hub,
   a plurality of blades attached to and extending from said hub,
   a crack detection system operatively associated with each of said blades and adapted to detect and indicate the presence of a crack in the spar of each blade,
   said crack detection system comprising a substantially impermeable liner lining the interior of said spar for a substantial part of its length, a highly permeable bleeder cloth located between said liner and said spar and maintaining said liner spaced from said spar,
   means for sealing the area occupied by said bleeder, between said liner and said spar, means for connecting a vacuum source to said area for evacuating same,
   pressure sensitive means in communication with said area for sensing a loss of vacuum therein and indicating means operatively associated with said sensing means for indicating said loss of vacuum.

8. The combination of claim 7 wherein said bleeder cloth is made of Dacron and said liner comprises a lamination of two layers of polyester terephthalate with a layer of aluminum for between.

9. The combination of claim 7 wherein a de-ice blanket covers the leading edge of each spar, said de-ice blanket being bonded to said spar by an adhesive material and wherein selected portions of said adhesive material are removed to form air path channels therein whereby air is capable of contacting a crack formed in said spar beneath said de-ice blanket.

10. A method of inspecting a helicopter rotor blade spar to detect a crack therein, comprising inserting a substantially impermeable liner inside said spar so that said liner lines said spar for substantially its entire length, positioning a highly permeable bleeder cloth between said linear and said spar, said bleeder maintaining said liner spaced from said spar, sealing said area occupied by said bleeder, evacuating said area and maintaining a vacuum therein, connecting a pressure sensing device in operative communication with said evacuated area, said pressure sensing means being operatively associated with an indicating means to detect a loss of vacuum in said evacuated area which is indicative of the presence of a crack in said spar.

11. The method of claim 10 wherein said spar has a de-ice blanket covering the leading edge thereof and is bonded thereto by an adhesive material, and wherein air channels have been provided in said adhesive material by removing a portion thereof for enabling air to reach a crack formed in said spar beneath said de-ice blanket.

References Cited
UNITED STATES PATENTS

| | | | |
|---|---|---|---|
| 3,134,445 | 5/1964 | Hotchkiss | 416—61 |
| 3,547,555 | 12/1970 | Jensen | 416—61 |
| 2,346,423 | 4/1944 | Gray | 73—40 |
| 2,749,743 | 6/1956 | Foster | 73—49.3 |

MARTIN P. SCHWADRON, Primary Examiner

C. F. SCHIMIKOWSKI, Assistant Examiner

U.S. Cl. X.R.

73—40, 49.3; 416—226